US006537686B1

United States Patent
Chen

(10) Patent No.: US 6,537,686 B1
(45) Date of Patent: Mar. 25, 2003

(54) MAGNETO-RESISTANCE RECORDING MEDIA COMPRISING A SILICON NITRIDE CORROSION BARRIER LAYER AND A C-OVERCOAT

(75) Inventor: Ga-Lane Chen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/536,307

(22) Filed: Mar. 27, 2000

Related U.S. Application Data
(60) Provisional application No. 60/134,944, filed on May 19, 1999.

(51) Int. Cl.[7] .............................. G11B 5/66; G11B 5/72
(52) U.S. Cl. ...................... 428/678; 428/611; 428/632; 428/213; 428/694 TP; 428/694 TC; 428/694 TS; 428/694 TF; 428/694 TM
(58) Field of Search ................................. 428/611, 678, 428/332, 694 TP, 694 TC, 694 TS, 694 TF, 694 TM, 213

(56) References Cited

U.S. PATENT DOCUMENTS

| | | | |
|---|---|---|---|
| 4,761,334 A | | 8/1988 | Sagoi et al. |
| 4,839,244 A | | 6/1989 | Tsukamoto |
| 4,994,330 A | | 2/1991 | Steininger |
| 5,672,425 A | | 9/1997 | Sato et al. |
| 5,741,577 A | * | 4/1998 | Yamamoto et al. .......... 428/212 |
| 5,763,071 A | * | 6/1998 | Chen et al. .................. 428/332 |
| 5,780,135 A | | 7/1998 | Kikitsu et al. |
| 5,871,841 A | * | 2/1999 | Kuratomi .................... 428/332 |
| 5,930,077 A | * | 7/1999 | Obata et al. ................. 360/122 |
| 5,968,679 A | * | 10/1999 | Kobayashi et al. ......... 428/332 |
| 6,001,447 A | * | 12/1999 | Tanahashi et al. .......... 428/336 |
| 6,033,772 A | * | 3/2000 | Lo et al. ..................... 428/332 |
| 6,071,607 A | * | 6/2000 | Okuyama et al. ........... 428/332 |
| 6,077,586 A | * | 6/2000 | Bian et al. ................ 204/192.2 |
| 6,143,388 A | * | 11/2000 | Bian et al. ................... 360/128 |
| 6,150,015 A | * | 11/2000 | Bertero et al. .............. 428/332 |

OTHER PUBLICATIONS

"Evaluation of Amorphous Diamond–Like Carbon–Nitrogen Films as Wear Protective Coatings on Thin Film Media and Thin Film Head Sliders", Siversen, J., Wang, G., Chen, G., and Judy, J., IEEE Trans. Mag., 33(1), 1997, 926–931.*
"Dual Layered Overcoat for MR Recording Media", Chen, G., Wu, J., and Weiss, J., IEEE Trans. Mag., 35(5), 1999, 2364–2366.*
Zou, J., Langhlin, D., and Lambeth, D., IEEE Trans. Mag., 34(4), 1998, 1582–1584).*

* cited by examiner

Primary Examiner—Paul Thibodeau
Assistant Examiner—Kevin M. Bernatz
(74) Attorney, Agent, or Firm—McDermott, Will & Emery

(57) ABSTRACT

A magnetic recording medium is provided with a dual layer protective overcoat system comprising a SiN corrosion barrier layer, as at a thickness of about 25Å to about 50 Å, and a protective carbon-containing overcoat layer thereon, as at a thickness of about 25 Å to about 50 Å,. The SiN layer effectively prevents or significantly reduces Co and Ni diffusion to the medium surface. Embodiments include magnetic recording media comprising a SiN corrosion barrier layer over a magnetic layer and a protective layer of amorphous hydrogenated carbon, amorphous nitrogenated carbon, amorphous hydrogen-nitrogenated carbon, ion-beam deposited carbon or cathodic-arc-deposited carbon on the SiN corrosion barrier layer, with solid and mobile lube layers are sequentially deposited on the protective carbon layer.

11 Claims, 2 Drawing Sheets

MAGNETO-RESISTANCE RECORDING MEDIA COMPRISING A SILICON NITRIDE CORROSION BARRIER LAYER AND A C-OVERCOAT

RELATED APPLICATIONS

This application claims priority from provisional patent application Ser. No. 60/134,944 filed May 19, 1999, entitled "CORROSION BARRIER SiN THIN FILM FOR MR/GMR DISK," the entire disclosure of which is hereby incorporated by reference herein.

TECHNICAL FIELD

The present invention relates to magnetic recording media, particularly rotatable magnetoresistance (MR) or giant magnetoresistance (GMR) recording media, such as thin film magnetic disks cooperating with a magnetic transducer head. The present invention has particular applicability to high areal density magnetic recording media designed for drive programs having reduced flying height, or pseudo-contact/proximity recording.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too smooth, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers. The surface of an underlayer can also be textured, and the texture substantially replicated in subsequently deposited layers.

Conventional longitudinal recording media typically comprise a substrate, such as aluminum (Al) or an Al alloy, e.g., aluminum-magnesium (Al—Mg) alloy, plated with a layer of amorphous nickel-phosphorus (NiP). Alternative substrates include glass, ceramic, glass-ceramic, and polymeric materials and graphite. The substrate typically contains sequentially deposited on each side thereof at least one underlayer, such as chromium (Cr) or a Cr-alloy, e.g., chromium vanadium (CrV), a cobalt (Co)-base alloy magnetic layer, a protective overcoat typically containing carbon, and a lubricant. The underlayer, magnetic layer and protective overcoat, are typically sputter deposited in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective overcoat to prevent wear between the disk and head interface during drive operation. Excessive wear of the protective overcoat increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

A conventional material employed for the lubricant topcoat comprises a perfluoro polyether (PFPE) which consists essentially of carbon, fluorine and oxygen atoms. The lubricant is typically dissolved in an organic solvent, applied and bonded to the carbon overcoat of the magnetic recording medium by techniques such as dipping, buffing, thermal treatment, ultraviolet (UV) irradiation and soaking.

The escalating requirements for high areal recording density impose increasingly greater requirements on thin film magnetic recording media in terms of coercivity, stiction, squareness, medium noise and narrow track recording performance. In addition, increasingly high areal recording density and large-capacity magnetic disks require smaller flying heights, i.e., the distance by which the head floats above the surface of the disk in the CSS drive (head-disk interface). For conventional media design, a decrease in the head to media spacing increases stiction and drive crash, thereby imposing an indispensable role on the carbon-protective overcoat.

There are various types of carbon, some of which have been employed for a protective overcoat in manufacturing a magnetic recording medium. Such types of carbon include hydrogenated carbon, graphitic carbon or graphite, and nitrogenated carbon or carbon nitride and hydrogen-nitrogenated carbon. These types of carbon are well known in the art and, hence, not set forth herein in great detail.

Generally, hydrogenated carbon or amorphous hydrogenated carbon has a hydrogen concentration of about 5 at. % to about 40 at. %, typically about 20 at. % to about 30 at. %. Hydrogenated carbon has a lower conductivity due to the elimination of the carbon band-gap states by hydrogen. Hydrogenated carbon also provides effective corrosion protection to an underlying magnetic layer. Amorphous carbon nitride, sometimes referred to as nitrogenated carbon, generally has a nitrogen to hydrogen concentration ratio of about 5:20 to about 30:0. Hydrogen-nitrogenated carbon generally has a hydrogen to nitrogen concentration ratio of about 30:10 to 20:10 (higher concentration of hydrogen than nitrogen).

Amorphous (a) hydrogen-nitrogenated carbon can be represented by the formula a-$CH_xN_y$, wherein "x" is about 0.05 (5.0 at. %) to about 0.20 (20 at. %), such as about 0.1 (10 at. %) to about 0.2 (20 at. %), and "y" about 0.03 (3.0 at. %) to about 0.30 (30 at. %), such as about 0.03 (3.0 at. %) to about 0.07 (7.0 at. %). A particularly suitable composition is a-$CH_{0.15}N_{0.05}$. Graphitic carbon or graphite contains substantially no hydrogen and nitrogen.

The drive for high areal recording density and, consequently, reduced flying heights, challenges the capabilities of conventional manufacturing practices. For example, a suitable protective overcoat must be capable of preventing corrosion of the underlying magnetic layer, which is an electrochemical phenomenon dependent upon factors such as environmental conditions, e.g., humidity and temperature. In addition, a suitable protective overcoat must prevent migration of ions, such as cobalt (Co) and nickel (Ni), from underlying layers into the lubricant topcoat and to the surface of the magnetic recording medium forming defects such as asperities. A protective overcoat must also exhibit the requisite surface for wear resistance, lower stiction, and some polarity to enable bonding thereto of a lubricant topcoat in an adequate thickness.

Furthermore, as the head disk interface decreases to less than about 1 μinch, it is necessary to reduce the thickness of the carbon-containing protective overcoat to below about 75 Å, in order to improve the performance of the magnetic recording and reduce the spacing loss between the read/write head and magnetic recording medium surface. However, when the thickness of the carbon-containing protective overcoat is reduced to below about 75 Å, corrosion becomes a significant issue and head crash is encountered because the protective overcoat exhibits very poor tribological properties and low reliability. Most GMR and MR media overcoats comprise a single layer of carbon material, such as amorphous hydrogenated carbon or amorphous nitrogenated carbon and exhibit adequate reliability at a thickness of about 125 Å to about 250 Å. However, as the thickness of the carbon-containing overcoat is reduced to below about 75 Å, head crash occurs, presumably because of lower wear resistance and the discontinuities formed in the sputter deposited layer.

In addition, corrosion becomes a significant factor in that Co and Ni diffuse through the thin protective overcoat to the medium surface.

Tanahashi et al. in U.S. Pat. No. 6,001,447 disclose a magentic recording medium comprising an underlayer structure containing a layer of Cr or a Cr alloy with a Cr—Co alloy layer thereon. Kikitsu et al. in U.S. Pat. No. 5,780,135 disclose a magnetic recording medium comprising a silicon nitride protective layer. Sato et al. in U.S. Pat. No. 5,672,425 disclose a magnetic recording medium comprising a multi-layer protective film structure including a metallic corrosion resistant protective film with a hard durable protective film thereon, the hard durable protective film containing materials such as silicon nitride. Tsukamoto in U.S. Pat. No. 4,839,244 discloses a magnetic recording medium comprising a composite protective overcoat including a first layer inclusive of aluminum oxide, silicon nitride, aluminum nitride, silicon carbide and tungsten carbide, with a graphite fluoride layer thereon. Sagoi et al. in U.S. Pat. No. 4,761,334 discloses a magnetic recording medium comprising a silicon nitride film with a lubricant thereon.

Steininger in U.S. Pat. No. No. 4,994,330 disclose a magneto-optical recording medium comprising an anti-corrosion layer containing carbides, nitrides and/or oxides, e.g., silicon nitride.

There exists a continuing need for magnetic recording media comprising a protective overcoat system capable of satisfying the imposing demands for high areal recording density, corrosion resistance and reduced head-disk interface. There also exists a particular need for an MR or a GMR magnetic recording medium having a protective overcoat with a thickness of less than about 75 Å exhibiting excellent tribological properties at very low glide heights and long term durability.

Disclosure of the Invention

An advantage of the present invention is an effective MR or GMR magnetic recording medium comprising a protective overcoat exhibiting excellent tribological properties at very low glide heights, good corrosion resistance and long term durability.

Another advantage of the present invention is a magnetic recording medium comprising a protective overcoat having a thickness of less than about 75 Å exhibiting excellent tribological properties at very low glide heights, superior corrosion resistance and long term durability.

Additional advantages and other features of the present invention will be set forth in part in the description which follows and in part will become apparent to those having ordinary skill in the art upon examination of the following disclosure or may be learned from the practice of the present invention. The advantages of the present invention may be realized and obtained as particularly pointed out in the appended claims.

According to the present invention, the foregoing and other advantages are achieved in part by a magnetic recording medium comprising: a non-magentic substrate; a seedlayer on the substrate; an intermediate layer on the seedlayer; an underlayer on the intermediate layer; a non-magnetic grain epitaxy layer on the underlayer; at least one magnetic layer on the non-magnetic grain epitaxy layer; a corrosion barrier layer of silicon nitride over the magnetic layer; and a protective carbon-containing overcoat on the silicon nitride layer.

Embodiments of the present invention comprise magnetic recording media having a silicon nitride corrosion barrier layer and a protective carbon-containing protective overcoat layer with a combined thickness less than about 75 Å. Embodiments of the present invention include depositing the silicon nitride corrosion barrier layer at a thickness of about 10 Å to about 50Å, e.g., about 25Å to about 50 Å, and depositing the protective carbon overcoat at a thickness of about 10 Å to about 50 Å, e.g., at about 25 Å to about 50 Å, on the silicon nitride corrosion barrier layer. Embodiments of the present invention further comprise sequentially depositing on a Ni—P plated substrate, a nickel aluminum (NiAl) or oxidized NiAl seedlayer, a Cr or Cr alloy intermediate layer, a Cr alloy underlayer, a non-magnetic grain epitaxy layer comprising Co and Cr, a first magnetic layer comprising Co, Cr, Ta, and a second magnetic layer comprising Co, Cr and platinum (Pt). Solid and mobile lube layers, such as a perfluoropolyether, can be sequentially applied to the protective carbon overcoat.

Additional advantages of the present invention will become readily apparent to those having ordinary skill in the art from the following detailed description, wherein the embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and

DESCRIPTION OF THE INVENTION

Figure 1:
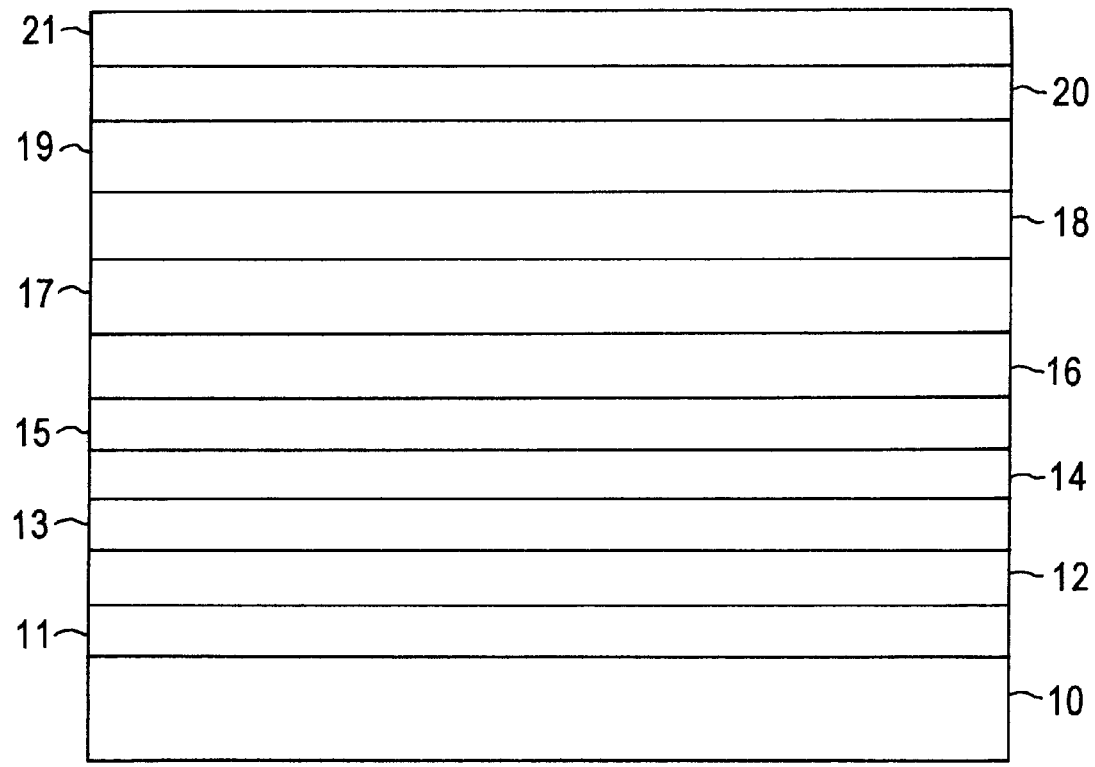
FIG. 1 schematically illustrates a magnetic recording medium in accordance with an embodiment of the present invention.

The present invention enables the manufacture of MR and GMR magnetic recording media containing a dual protective overcoat system, comprising a silicon nitride corrosion barrier and foundation layer and a protective carbon overcoat, having a total thickness less than about 75 Å, which media exhibit superior corrosion resistance, excellent tribological properties at a very low glide height, e.g., below about 1 μinch, and long term durability. Embodiments of the present invention, therefore, enable the manufacture of MR and GMR magnetic recording media with good corrosion resistance, improved magnetic recording performance and reduced spacing loss between the read/write head and magnetic recording surface by reducing the total overcoat thickness to even less than 75 Å, e.g., less than about 50 Å.

The silicon nitride corrosion barrier layer in accordance with embodiments of the present invention can be represented by the formula $SiN_x$, whenin x=1 to 1.5, and can be deposited by reactive sputtering in a gas mixture comprising argon and nitrogen. The silicon nitride layer serves as a corrosion barrier layer preventing or significantly reducing corrosion by preventing or significantly reducing Co and Ni migration to the medium surface, and further serves as a foundation layer for the subsequently deposited protective carbon layer. The silicon nitride corrosion barrier layer can be deposited as a thickness of about 10 Å to about 50 Å, such as about 25 Å to about 50 Å, e.g. about 25 Å. A protective carbon-containing layer is then deposited on the silicon nitride corrosion barrier layer. The protective carbon-containing layer can comprise any of various diamond-like carbon (DLC) overcoats, such as amorphous hydrogenated carbon (a-C:H), amorphous nitrogenated carbon (a-C:N), amorphous hydrogenated-nitrogenated carbon (a-C:HN), ion-beam deposited carbon (ibd-C) or cathodic-arc-deposited carbon (cad-C). The protective carbon layer can be deposited at a thickness of about 10 Å to about 50 Å, such as about 25 Å to about 50 Å, e.g., about 25Å.

Embodiments of the present invention comprise magnetic recording media with an initial solid lube layer on the carbon-containing protective layer, and a mobile lube layer, such as a perfluoropolyether lubricant, e.g., Z-DOL®, Z-TETRAOL® or AM201®, to enhance tribology and durability of the head-disk interface. The solid lube layer can be deposited at a suitable thickness, such as 10 Å to about 30 Å, while the mobile lube layer can be deposited at a suitable thickness, such as about 5 Å to about 15 Å. Magnetic recording media in accordance with the present invention can comprise any conventional substrate, such as NiP/Al or an NiP/Al alloy substrate, Al or an Al alloy substrate, or a glass, ceramic, glass-ceramic or polymeric substrate.

Advantageously, the dual layer protective overcoat system of the present invention provides enhanced durability and effectively prevents corrosion of the underlying magnetic layer and prevents migration of ions from underlying layers. The exact operative mechanism enabling the formation of a uniform, continuous protective overcoat, at a thickness of less than about 75 Å, e.g., less than 50 Å, while providing good corrosion resistance and avoiding head crash is not known with certainty. However, it is believed that the initially deposited silicon nitride layer serves as a protective corrosion barrier preventing the migration of ions, such as Co and Ni, and also enables the formation of a protective carbon-containing layer having a uniform thickness without discontinuities or voids, thereby providing excellent tribological properties at a very low glide height, e.g., less than about 1 μinch, with long term durability.

Embodiments of the present invention comprise sequentially depositing on each side of a non-magnetic substrate, such as a substrate containing an electrolessly deposited or sputtered NiP layer, a seedlayer, such as NiAl or an oxidized NiAl seedlayer, at a thickness of about 50 Å to about 1000 Å, e.g., 800 Å for a glass substrate, an intermediate layer at a thickness of about 100 Å to about 300 Å, e.g., about 150 Å, comprising Cr or an alloy of Cr with one or more of tungsten, molybdenum, vanadium, titanium, or oxygen (e.g., chromium oxide), an underlayer having a thickness of about 50 Å to about 150 Å, comprising a Cr alloy, such as chromium-tungsten or chromium-vanadium, a non-magnetic grain epitaxy layer comprising Co-Cr or an alloy of Co, Cr and at least one of tantalum, molybdenum, tungsten, vanadium, niobium, or titanium, at a thickness of about 10 Å to about 50Å, e.g., about 30 Å; a first magnetic layer, such as a cobalt-chromium-tantalum layer containing one or more of boron, nickel, niobium, tungsten and molybdenum, without platinum, at a thickness of about 50 Å to about 200 Å; and a second magnetic layer comprising cobalt-chromium-platinumand at least one of tantalum, niobium, boron, nickel, molybdenum, tungsten, vanadium, carbon and nitrogen, at a thickness of about 50 Å to about 200 Å.

Testing was conducted on magnetic recording media prepared with substantially the same layers in substantially the same manner except for the presence of a silicon nitride corrosion barrier layer. The testing revealed that magnetic recording media containing the silicon nitride corrosion barrier layer in accordance with the present invention, e.g., having the structure lube/C/$SiN_x$/CoCrPtTaNb/CoCr/CrW/Cr/NiP/Al, exhibited superior corrosion resistance and successfully passed 20,000 cycles of contact-start-stop (CSS) testing;

whereas, the corresponding media without the $SiN_x$ layer e.g., lube/C/CoCrPtTaNb/CoCr/CrW/Cr/NiP/Al, exhibited poor corrosion resistance and crashed within 20,000 cycles.

An embodiment of the present invention is schematically illustrated in FIG. 1 and comprises: a substrate 10, e.g., Al, an Al alloy, a polymer, a glass, a ceramic, or a glass-ceramic, and an electrolessly plated or a sputter deposited NiP coating 11 on substrate 10 that functions as a tribology foundation layer for mechanical or laser texturing. A seedlayer 12, such as NiAl or oxidized NiAl is sputter deposited on the NiP layer. A composite underlayer structure is then sputter deposited containing, sequentially: an intermediate layer 13, e.g., Cr or an alloy of Cr with tungsten, molybdenum, vanadium, titanium or chromium oxide; an underlayer 14, e.g., chromium-tungsten or chromium-vanadium; a non-magnetic grain epitaxy layer 15, e.g., an alloy of Co and Cr containing about 30 at. % to about 50 at. % Cr, e.g., about 37 at. % to about 43 at. % Cr, or an alloy of Co, Cr and tantalum, molybdenum, tungsten, vanadium or titanium. A first magnetic layer 16, e.g., an alloy of Co, Cr, tantalum and boron, nickel, niobium, tungsten or molybdenum is then sputter deposited and a second magnetic layer 17, e.g., an alloy of Co, Cr, Pt and one or more of tantalum, niobium, boron, nickel, molybdenum, tungsten, vanadium, carbon and nitrogen, is sputter deposited on the first magnetic layer. A silicon nitride corrosion barrier layer 18 is then deposited and a protective carbon-containing layer 19 sputter deposited thereon. A solid lube layer 20 and mobile lube layer 21 are then applied. It should be recognized that layers 11 through 21 are sequentially deposited on both sides of substrate 10 although, for illustrative clarity, FIG. 1 illustrates the sequential formation of layers 11 through 21 on one side of substrate 10.

EXAMPLES

Figure 2:
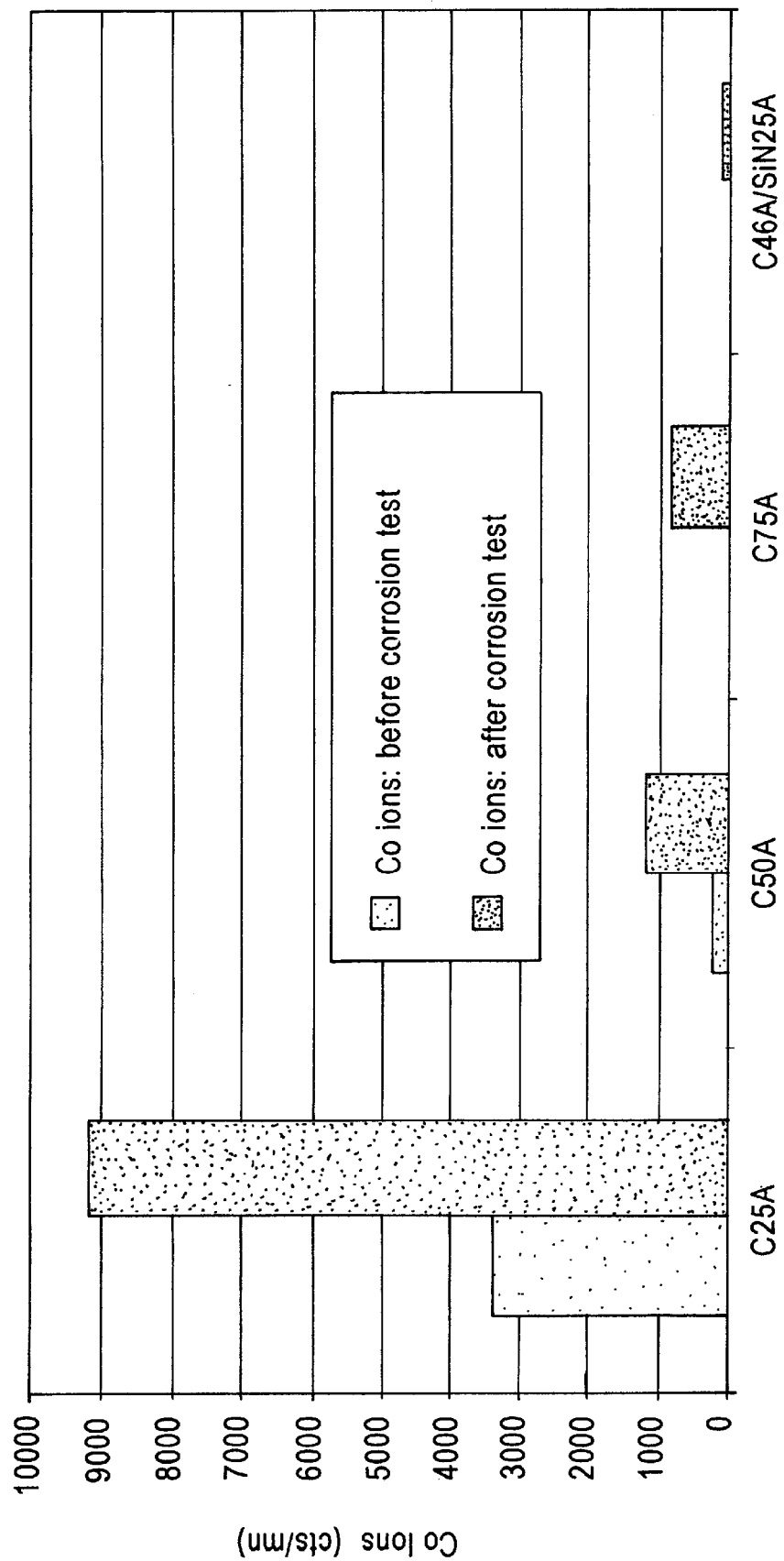
FIG. 2 is a graph showing the results of corrosion testing for magnetic recording media with and without a silicon nitride corrosion barrier layer.

Comparison testing was performed on a plurality of magnetic recording media. Each medium contained similar layers as was prepared in a similar manner, except that one group of media contained a $SiN_x$ corrosion barrier layer reactively sputtered in a gas mixture of argon and nitrogen to thicknesses of about 25 Å, 50Å and 75 Å. The media were maintained in a chamber for five days at 60° C. and 80% relative humidity. SIMS was employed to study the performance of corrosion-protection. Co ion intensity was employed to compare the performance before and after corrosion testing for the various overcoats. The results are reported in FIG. 2. It should be apparent that media comprising only a carbon protective overcoat, without the $SiN_x$ corrosion barrier layer of the present invention, exhibited serious corrosion issues for carbon thicknesses ranging from 25 Å, 50Å to 75 Å. Media containing a 25 Å $SiN_x$ barrier layer and a 46 Å carbon protective overcoat exhibited the best corrosion performance. The carbon protective overcoat on the $SiN_x$ corrosion barrier layer provides for CSS performance. Experimentation revealed that a medium containing a 25 Å $SiN_x$ corrosion barrier layer and 25 Å protective carbon overcoat exhibited superior tribiology as well as excellent corrosion performance.

Additional testing was conducted employing the structure having same layers prepared in the same manner as set forth in FIG. 1 except as indicated in table 1 for the protective overcoat. The samples and results are reported in Table 1 below, wherein the Co and Ni ion counts were conducted by secondary ion mask spectra (SIMS) on the media surfaces and indicate corrosion behavior. The results in Table 1 clearly illustrated that magnetic recording media in accordance with the present invention having a thin silicon nitride corrosion barrier layer exhibit superior corrosion resistance performance.

TABLE 1

| Exp.# | Description | Lube Type | Control Co | Control Ni | Stress Co | Stress Ni |
|---|---|---|---|---|---|---|
| C1 | SiN25Å + CHN25Å | | 0 | 0 | 202 | 483 |
| C2 | SiN37Å + CN37Å | | 0 | 0 | 1444 | 194 |
| C3 | SiN50Å | | 0 | 0 | 44 | 57 |
| D1 | a-CN 50 Å | | 0 | 44 | 2247 | 210 |
| D2 | a-CHN 50Å | | 0 | 0 | 21225 | 413 |
| D3 | a-CH50Å | | 477 | 0 | 7327 | 225 |

NOTES: The data was calibrated on a standard Disc.

The present invention provides magnetic recording media having a protective overcoat system at a thickness significantly less than 75 Å, e.g. less than 50 Å, for MR and MRG recording without encountering head crash, by providing an a silicon nitride corrosion barrier layer between a magnetic layer and a protective carbon layer. Magnetic recording media in accordance the present invention exhibit good corrosion resistance and excellent tribological properties at very low glide heights, e.g., less than about 1 μinch, good corrosion resistance and long term durability.

The present invention enjoys industrial utility in manufacturing any of various types of magnetic recording media, including thin film disks. The present invention is particularly applicable in producing high areal recording density magnetic recording media requiring a low flying height.

Only the preferred embodiment of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A magnetic recording medium comprising:
   a non- magnetic substrate;
   a seedlayer on the substrate;
   an intermediate layer on the seedlayer;
   an underlayer on the intermediate layer;
   a non-magnetic grain epitaxy layer;
   a first magnetic layer on the non-magnetic grain epitaxy layer;
   a second magnetic layer on the first magnetic layer;
   a corrosion barrier layer of silicon nitride on the second magnetic layer; and
   a protective carbon containing overcoat on the silicon nitride layer; wherein:
   the corrosion barrier layer of silicon nitride and the protective carbon-containing overcoat have a combined thickness less than 75 Å;
   the first magnetic layer comprises a magnetic cobalt (Co) alloy without platinum (Pt); and
   the second magnetic layer comprises a magnetic Co alloy with Pt.

2. The magnetic recording medium according to claim 1, the corrosion barrier layer of silicon nitride has a thickness of about 10 Å to about 50 Å; and
   the protective carbon-containing overcoat has a thickness of about 10 Å to about 5 Å.

3. The magnetic recording medium according to claim 1, wherein:
   the protective carbon-containing overcoat comprises amorphous hydrogenated carbon (a-C:H), amorphous nitrogenated carbon (a-C:N), amorphous hydrogen-nitrogenated carbon (a-C:$H_b N_c$), ion-beam deposited carbon (ibd-C), or cathodic-arc-deposited carbon (cad-C).

4. The magnetic recording medium according to claim 1, wherein the second magnetic layer is directly on the first magnetic layer.

5. The magnetic recording medium according to claim 1, further comprising a lubricant topcoat on the protective carbon-containing overcoat.

6. The magnetic recording medium according to claim 5, wherein the lubricant topcoat comprises a solid lube layer having a thickness of about 10 Å to about 30 Å.

7. The magnetic recording medium according to claim 6, wherein the lubricant topcoat further comprises a mobile lube layer having a thickness of about 5 Å to about 15 Å on the solid lube layer.

8. The magnetic recording medium according to claim 1, wherein:

the substrate comprises aluminum or an aluminum alloy, a glass, ceramic, glass-ceramic or polymeric material, or a metal-plastic composite, the substrate having a nickel-phosphorus plating thereon;

the seedlayer comprises nickel-aluminum (NiAl) or oxidized NiAl;

the intermediate layer comprises chromium (Cr) or a Cr alloy;

the underlayer comprises a Cr alloy;

the grain epitaxy layer comprises a Co—Cr alloy;

the first magnetic layer comprises a cobalt-chromium-tantalum alloy; and the second magnetic layer comprises a Co—Cr—Pt alloy.

9. The magnetic recording medium according to claim 8, wherein;

the corrosion barrier layer of silicon nitride layer has a thickness of about 10 Å to about 50 Å; and the protective carbon-containing overcoat has a thickness of about 10 Å to about 50 Å.

10. The magnetic recording medium according to claim 8, wherein:

the intermediate layer comprises chromium-tungsten, chromium-molybdenum, chromium-vanadium, chromium-titanium or chromium-oxide;

the underlayer comprises chromium-tungsten or chromium-vanadium;

the grain epitaxy layer comprises a Co—Cr alloy or an alloy of Co, Cr and one or more elements selected from the group consisting of tantalum, molybdenum, tungsten, vanadium, niobium and titanium;

the first magnetic layer comprises an alloy of Co, Cr, , tantalum and at least one element selected from the group consisting of boron, nickel, niobium, tungsten and molybdenum; and the second magnetic layer comprises an alloy of Co, Cr, Pt and at least one element selected from the group consisting of tantalum, niobium, boron, nickel, molybdenum, tungsten, vanadium, carbon and nitrogen.

11. The magnetic recording medium according to claim 10, wherein;

the seedlayer has a thickness of about 50 Å to about 1000 Å;

the intermediate layer has a thickness of about 100 Å to about 300 Å;

the underlayer has a thickness of about 50 Å to about 150 Å;

the grain epitaxy layer has a thickness of about 10 Å to about 50 Å;

the first magnetic layer has a thickness of about 50 Å to about 200 Å; and the second magnetic layer has a thickness of about 50 Å to about 200 Å.

* * * * *